N. T. HANSON.
COMPRESSED STEAM COOKER.
APPLICATION FILED JUNE 2, 1909.
952,112.
Patented Mar. 15, 1910.
3 SHEETS—SHEET 3.
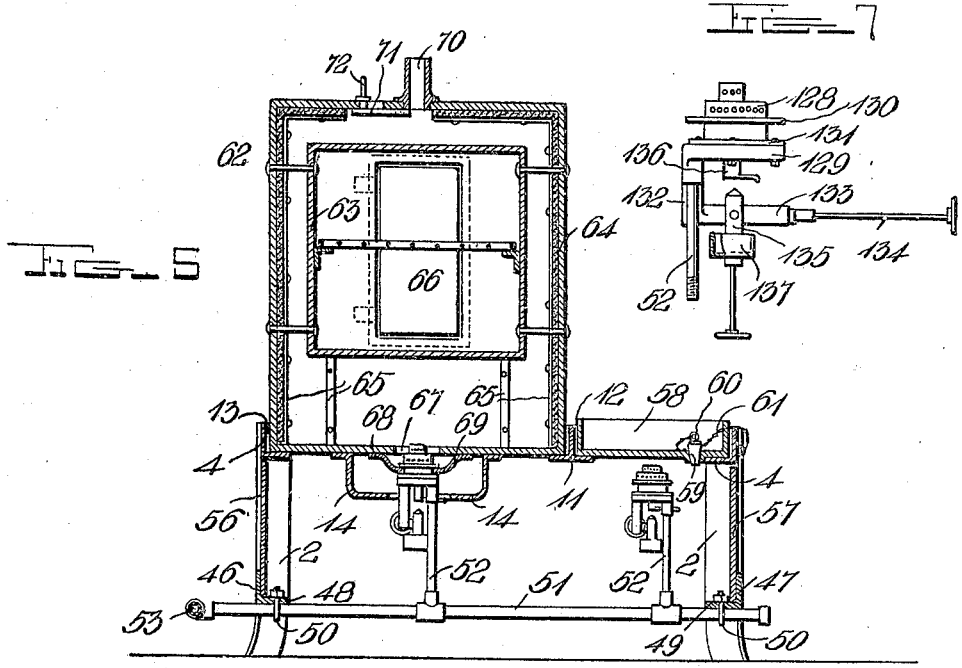
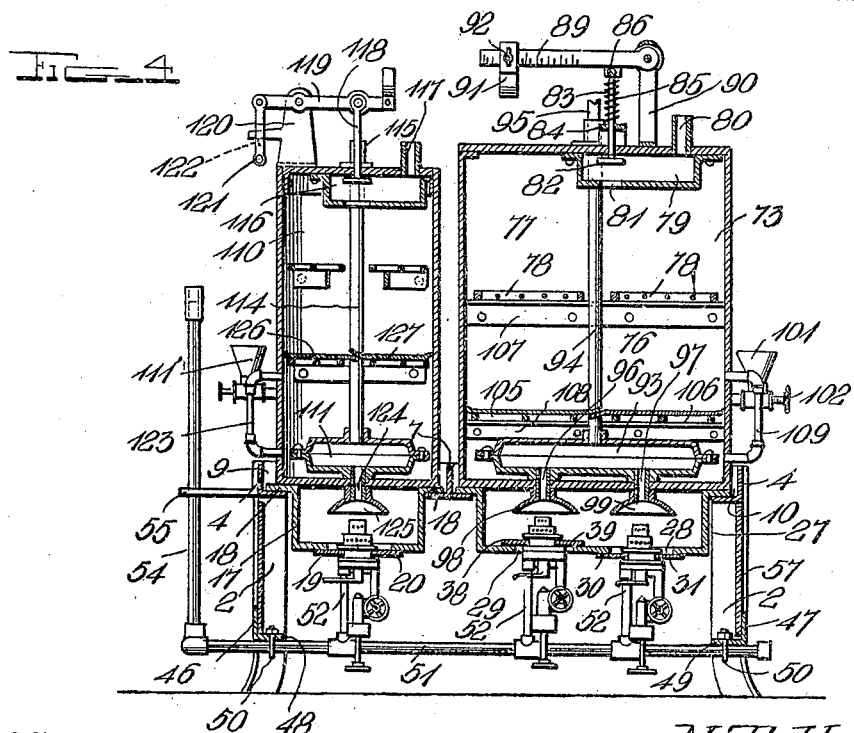
Witnesses
Inventor
N. T. Hanson

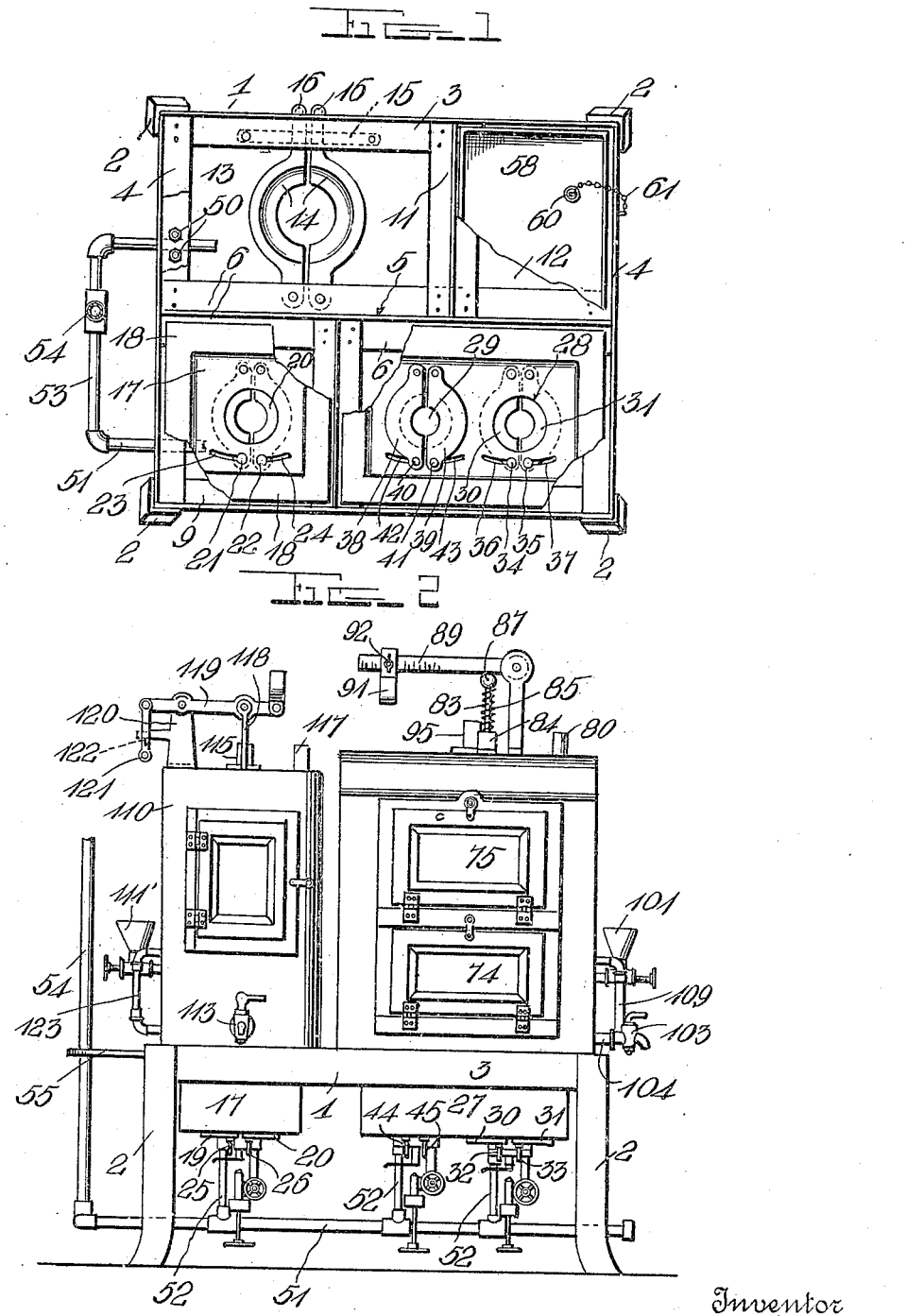

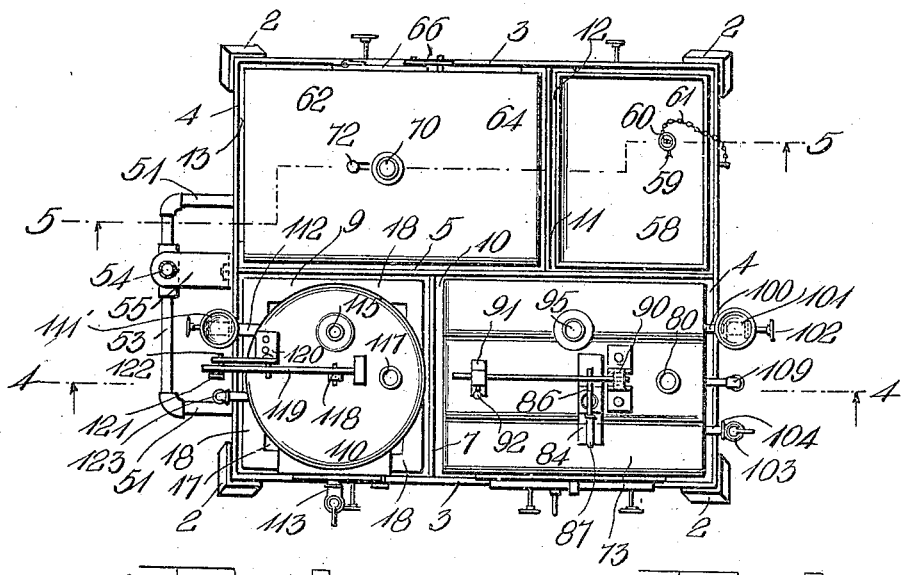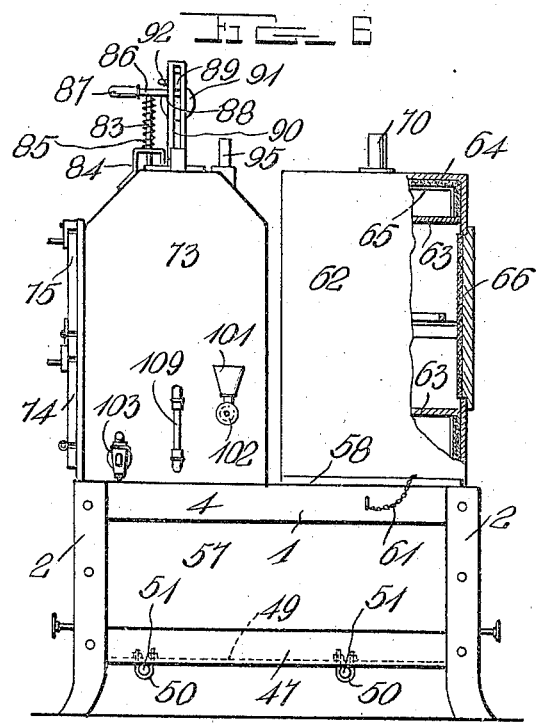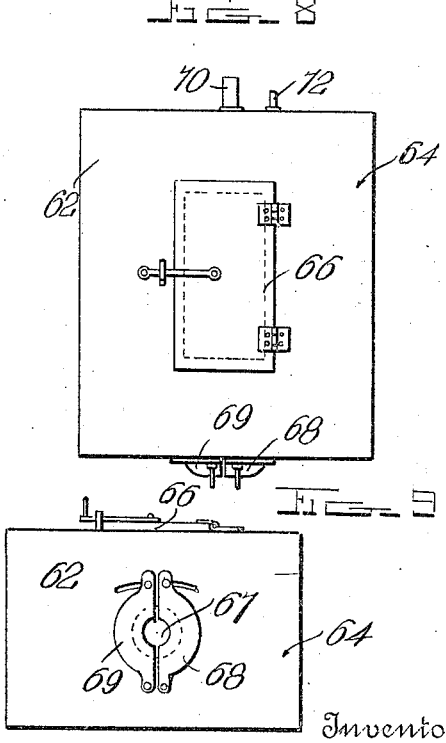

UNITED STATES PATENT OFFICE.

NELS T. HANSON, OF HAWARDEN, IOWA.

COMPRESSED-STEAM COOKER.

952,112.   Specification of Letters Patent.   Patented Mar. 15, 1910.

Application filed June 2, 1909. Serial No. 499,712.

*To all whom it may concern:*

Be it known that I, NELS T. HANSON, a citizen of the United States, residing at Hawarden, in the county of Sioux and State of Iowa, have invented certain new and useful Improvements in Compressed-Steam Cookers; and I do declare the following to be a full, clear, and exact description of the invention, such as will enable others skilled in the art to which it appertains to make and use the same.

This invention relates to an improved cooker especially adapted for use in hotels, restaurants and for army cooking.

The object of the invention is to provide a simply constructed and efficient cooker having a plurality of chambers some of which are equipped to cook by the steaming process and others arranged for cooking by means of hot air, and which is also preferably provided with an open water receptacle disposed over a burner and adapted to be used for washing dishes or for boiling water for other purposes.

With this and other objects in view, the invention consists of certain novel features of construction, combination and arrangements of parts as will be more fully described and particularly pointed out in the appended claims.

In the accompanying drawings: Figure 1 is a top plan view of the frame of this improved cooker with the chambers removed and with parts broken out; Fig. 2 is a front elevation of the cooker with the chambers in operative position; Fig. 3 is a top plan view of the complete cooker with the parts in operative position; Fig. 4 is a longitudinal vertical section taken through the two steam cooking chambers and through the frame of the cooker on line 4—4 of Fig. 3; Fig. 5 is a similar view taken through the hot air oven and the dish washer on line 5—5 of Fig. 3; Fig. 6 is an end elevation with parts broken out; Fig. 7 is a detail side elevation of the preferred form of burner; Fig. 8 is a front elevation of the hot air oven, and Fig. 9 is a bottom plan view thereof.

In the embodiment illustrated a frame 1, is shown preferably composed of angle irons having four legs as 2, arranged at opposite corners of the frame with their upper ends connected by side bars 3, and end bars 4, which are formed of angle irons with one flange arranged horizontally and extending inward and the other flange projecting upward against which the outer faces of the chambers are adapted to abut and prevent lateral movement of the latter. A T-bar 5, is arranged longitudinally of the supporting frame with its opposite ends connected to the end members 4, and with its flanges 6, thereof extending laterally in opposite directions from its lower edge and which are adapted to support burner casings to be described and the cooking chambers hereinafter described. A T-shaped bar 7, is arranged transversely between the centrallly disposed angle iron 5, and one of the side bars 3, and is secured at its opposite ends thereto preferably nearer one end member than the other to provide compartments 9 and 10 of unequal size, the smaller compartment 9, being designed to receive the round cooking chamber hereinafter described and the larger compartment 10 to receive the rectangular larger steam cooking chamber hereinafter to be described. Another T-bar 11, is arranged transversely between the other side member 3, and the angle bar 5, which extends longitudinally across the frame and this bar 11 is secured at its opposite ends to the horizontally disposed flanges of the bars 3 and 5, by rivets or other suitable means at a point nearer one end of the frame than the other to provide a small compartment 12, diagonally opposite the compartment 9, at the other side of the frame and a larger compartment 13, arranged diagonally opposite the large compartment 10, at the other side of the frame and which are designed to receive respectively the dish washer hereinafter to be described and the hot air oven also to be described hereafter.

Arranged in the bottom of the compartment 13, is a bowl shaped protector 14, for the burner which projects upward thereinto and which is designed to protect the burner from draft especially during windy weather when the cooker is used out of doors. This protector 14 is preferably composed of two parts pivotally connected at one end to one of the flanges 6 of the central T-bar 5 and which are designed to be brought together when in operative position close around the burner, the free ends of said protector being mounted in guides 15, formed on the lower face of the side member 3, and these free ends are preferably provided with handle members 16. A removable burner casing 17, is arranged in the compartment 9, and is provided at its upper ends with laterally extending flanges 18, which are adapted to rest on the flanges of the end member 4, side member 3, one flange of the T-bar 7 and the central T-bar 5. Secured to the bottom of this casing 17, are two laterally movable shutter members 19, and 20, which are preferably pivotally connected at one end to the bottom of the casing 17, being arranged below said bottom and are provided at their free ends with upwardly extending headed studs 21, and 22 which are adapted to move in arc shaped slots 23, and 24, arranged in the bottom of the casing 17, near the outer side thereof. These shutter members 19, and 20 are provided at their free ends with depending handles 25, and 26, which are clearly shown in Fig. 2. These shutters are designed to protect the burner which projects upwardly therebetween from draft. A similar casing 27, is arranged in the compartment 10, having laterally extending flanges resting on the horizontal flanges of the adjacent side and end members of the frame and the flanges of the T-bars and which may be removed when desired for cleaning or other purpose. The bottom of this casing 27, is provided with two openings 28, and 29, arranged in longitudinal alinement and through which the burners are adapted to project. Shutter members 30 and 31 similar to the members 19, and 20 of the casing 17, are arranged to surround the burner at the outer end of the casing 27, being mounted on the lower face of said bottom and provided with depending handles 32, and 33, for moving the headed studs 34, and 35, at the free ends of said members back and forth in the arc shaped slots 36, and 37, formed in the bottom of the casing 27, near its outer side wall.

Two shutter members 38, and 39, are pivotally connected at one end to the bottom of the casing 27, on its inner face preferably near the inner side wall thereof. These shutter members are provided at their free ends on their lower faces with depending studs 40 and 41, which project through arc shaped slots 42, and 43, formed in the bottom of the casing 27, and these studs are provided with suitable operating handles 44, and 45, for moving the shutters back and forth relatively to the burner which they are designed to protect. It will be obvious that the shutter members 38, and 39, being arranged on the inner face of the bottom of the casing 27, and the shutters 30 and 31, on the lower face thereof they may be adjusted as desired without conflicting with each other.

Two angle bars 46, and 47 connect the legs as at 2, at opposite ends of the frame preferably near the lower end of the legs, the ends of said bars being arranged within the legs with one flange thereof extending laterally inward. The inwardly extending flanges 48, and 49, are provided with longitudinally spaced apertures to receive U-shaped hook bolts as 50, which form hangers for supporting the gas pipes 51, which are arranged longitudinally of the frame under the compartments 9, and 10, and 12, and 13, respectively. Extending upward from these gas pipes 51, are branch pipes as 52, which project upwardly through the shutters of the various casings above described and are provided at their upper ends with burners of any suitable construction. These pipes 51, extend at one end beyond the frame 1, and have their ends connected by cross pipe 53, with which an upright pipe 54, is connected by a suitable coupling for supplying gas or gasolene as the case may be to the burners. Extending laterally from the end of the frame to its upper end is a pipe support 55, which may be of any suitable or desired construction, being preferably in the form of an L-shaped plate having an aperture in its laterally extending arm through which the pipe 54, is adapted to extend, the other end of said arm being bolted to the frame. End plates 56, and 57, are preferably arranged between the legs and are made of a width sufficient to span the space between the upper end members 4 and tne lower connecting bars 46, and 47. It will be obvious that these gas pipes 51, with the burners attached thereto may be removed by unscrewing the U-shaped hook bolts 50, whereby the pipes may be entirely removed from the frame if desired.

An open receptacle 58, which is especially designed for washing dishes is constructed to fit within the compartment 12, and is preferably provided in the bottom thereof with a drain opening 59, which is adapted to be closed by a stopper 60, which is preferably secured by a chain 61, to the frame 1 to prevent its becoming lost when not in use.

A hot air cooking chamber forming a baking oven 62, is preferably mounted in the compartment 13, being supported by the laterally extending flanges of the compartment 13, and which is held against lateral movement by the upwardly projecting flanges of said compartment. This chamber 62, is preferably composed of an inner casing 63, preferably of steel which is spaced from the outer casing 64, and both of which are made air tight. The outer casing 64, is preferably lined with pasteboard asbestos or any other suitable insulating material which is fire-proof. This asbestos lining is preferably secured to the casing 64 by steel straps as 65, which are designed to hold the asbestos close against the inner faces of the outer casing. A door opening in the front face of this chamber is closed by a door 66, of any suitable construction which is preferably lined with asbestos to prevent the escape of heat from the oven. The outer casing is provided in the bottom thereof with an opening 67, through which the burner which projects into the casing 14 is adapted to project to supply heat to the space formed between the inner casing 63, and the outer casing 64 see Fig. 5. Two shutters 68, and 69 are arranged on the bottom of the chamber 62, and are adapted to close around the burner similar to the shutters above described. The top of the casing 64, is provided with an outlet 70 for the products of combustion and for the air after it has passed around in the space between the casings. A laterally movable slide or damper 71, is arranged to open or close this outlet 70, and is provided with an upwardly projecting handle 72. This damper is designed to regulate the heat of the oven, it being understood that when it is desired to cool off the oven the damper is opened to its full extent. The two casings 63, and 64, are preferably connected by means of bolts.

A large steam cooking chamber 73, preferably made approximately rectangular is designed to be removably supported in the compartment 10, of the frame 1. This steam chamber 73, is especially designed for heavy cooking where a great quantity of food is to be prepared. This chamber is preferably provided with two doors 74, and 75, which open into the two compartments 76, and 77, of the oven which are separated by the ordinary skeleton rack 78. A small steam dome 79, is arranged in the top of the compartment 77, and has an outlet 80 opening through the top of the chamber. This dome 79, has an opening 81, which communicates with the compartment 77, of the chamber and is provided with a spring pressed closure 82, preferably in the form of a disk mounted on an upright shaft 83, which projects upwardly through the top of the chamber 73, and through a strap 84, bolted to said chamber and on which a coil spring 85, is mounted between the strap 84, and a head 86, formed at the upper end of the shaft. This spring is designed to hold said closure normally in open position. This head 86, is preferably made in the form of a T one arm of which has a handle 87, connected therewith and the other arm 88, of which is adapted to extend under a weighted lever 89, which is pivotally mounted at one end in an upright 90, secured to the top of the chamber 73. This lever 89, is provided with a scale and a weight 91 is slidably mounted thereon and is adapted to be secured in adjusted position by means of a set screw 92, the weight being adjustable to various points on the scale to hold the closure at a predetermined point relative to the opening at the inner side of the steam dome.

A gas dome 93, is arranged in the bottom of the chamber 73, and is preferably made in two sections, the upper section having a gas discharge pipe 94, preferably screwed in connection therewith and which projects upwardly through the chamber 73, and is connected with a gas outlet 95, screwed to the outer face of the top of the chamber 73. The lower section of the gas dome is provided with two depending pipes 96, and 97 which extend through the bottom of the chamber 73, and are provided on their lower ends with cone shaped collecting caps 98, and 99, which are adapted to extend over the burners which project into the casing 27 and collect the heat therefrom and pass it upward into the dome 93. A water inlet pipe 100, extends through one end of the chamber 73, and discharges around the gas dome 93. This supply pipe 100, is provided outside the chamber 73, with a funnel 101, and with a screw valve 102, for closing the pipe when not in use. A faucet 103, is also arranged outside the chamber and is connected with an outlet or discharge pipe 104, which is adapted to draw off the water from the chamber 73, when desired. Two racks 105, and 106, which are preferably made of wire are covered with cotton felt and arranged within the compartment 76, over the gas dome 93, and are designed to overlap thereby forcing the steam to pass through the felt and cause it to dry out during such passage to provide dry steam for cooking and baking within the compartments 76, and 77. Arranged at the front and back of this chamber 73 near the bottom thereof in a plane parallel with the top of the gas dome are two inwardly extending flanges as, 108 on which the racks 105 and 106 are adapted to be supported. A water gage 109 is preferably arranged on one end of the chamber 73, outside thereof to show the amount of water contained in said chamber. A smaller steam chamber 110 is adapted to fit within the compartment 9, of the frame 1, and is constructed similarly to the chamber 73, except that it is made round instead of rectangular being provided in the bottom thereof with a gas dome 111, having a water inlet 112, constructed in the same manner as the inlet for the chamber 73, and a faucet 113, for draining the water from the chamber 110 when desired. A funnel 111' is arranged on the inlet pipe 112, as shown in Figs. 2, 3, and 4. A pipe 114, leads upward through the chamber 110 from said gas dome and is connected at its upper end with an outlet 115, for conveying the products of combustion to the atmosphere or any desired point of deposit. A steam dome 116, is arranged in the upper end of the chamber 110, and is provided with the usual outlet 117 and has a valved opening communicating with the interior of the chamber, the valve or closure for said opening being carried by a rod 118 which projects through the upper end of the chamber and is connected with the weighted end of a lever 119, which is pivoted intermediately of its ends to an upright 120 mounted on the chamber 110, said lever having a catch member 121 adapted to engage a projection 122 on said upright 120 for holding the valve in open position.

A water gage 123, is arranged outside the chamber 110, and is designed to indicate the amount of water contained within the chamber. A pipe 124, extends outwardly from the gas dome 111, through the bottom of the chamber 110 and is provided with a bell or cone shaped collecting cap 125, which is adapted to fit over the burner which projects into the casing 17 and gather the heat into the gas dome 111. Arranged within the chamber 110, is a rack composed of two sections 126, and 127, covered with cotton felt which are designed to be supported within the chamber over the gas dome and through which the steam is adapted to pass to provide a dry heat for baking when desired. If it is desired to have a moist heat these felt covered rack members may be removed and an ordinary skeleton rack substituted therefor.

Any suitable burner may be mounted on the burner pipes 52, that preferably used being shown in detail in Fig. 7, and is adapted for use when gasolene is employed as the fuel and comprises a gas cap 128, preferably provided with two rows of holes opening radially from the cap, said cap being preferably provided with two flanges one of which is bolted to the gas cap 128 and the other to the casing 129, the shutters on the lower face of the steam chamber 73, being designed to close around the burner between the two vertically spaced flanges 130 and 131. The casing 129 is adapted to be screwed on the gas pipe 132. A gas discharge pipe 133, is connected with the gas casing and extends laterally therefrom and is provided with a needle valve 134, for regulating the amount of gas passing through an extension 135, which projects upwardly therefrom and opens into a pipe 136, depending from the perforated burner. A gasolene cup 137, is arranged below the burner and is adapted to be filled with gasolene and set afire to heat the burner when first lighted for generating gas therein.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention:

1. In an apparatus of the class described the combination of a supporting structure provided with a plurality of compartments having heating means arranged therebelow, cooking chambers arranged in said compartments, heat collecting domes arranged in said chambers, pipes leading from said domes through said chambers to the atmosphere, means for supplying water to the spaces around said domes, racks arranged over said domes and provided with a steam drying covering, and adjustable means for permitting the steam to pass out from said chambers.

2. An apparatus of the class described comprising a supporting structure provided with a plurality of compartments having removable burner casings arranged therein, cooking chambers arranged in said compartments over said casings, each chamber having a heat collecting dome arranged therein communicating with the burner casing, and pipes leading from said dome through said chambers, a water inlet pipe opening into said chamber above said dome, a valve for closing said pipe, means for drawing off the water from said chamber, a steam dome arranged in the top of the chamber and having an outlet to the atmosphere and a valved opening communicating with the chamber, and means for adjusting said valve to permit a predetermined amount of steam to pass out from said chamber.

3. In an apparatus of the class described the combination of a supporting structure, a burner casing arranged therein and provided with laterally movable shutters, a burner projecting through said shutters, a cooking chamber arranged over said burner, a steam dome arranged in the upper end of said chamber and having an opening communicating with the chamber, an outlet pipe connected with said dome, a closure for the opening between said dome and chamber, a rod connected with said closure and projecting through the top wall of said chamber, means connected with said rod for holding it in adjusted position, and means for supplying water to the lower part of said chamber whereby steam is generated therein.

4. In an apparatus of the class described the combination of a supporting structure, a burner casing arranged therein and provided with laterally movable shutters, a burner projecting into said casing between said shutters, a cooking chamber arranged over said burner, a steam dome arranged in the upper end of said chamber and having an opening communicating with the chamber, an outlet pipe connected with said steam dome, a closure for said dome opening, a rod connected with said closure and projecting through the top wall of said chamber, means connected with said rod for holding it in adjusted position, means for supplying water to the lower part of said chamber whereby steam is generated therein, racks arranged to fit tightly within said chamber above the water therein, and provided with felt coverings.

5. In an apparatus of the class described the combination of a supporting structure provided with a plurality of compartments having removable burner casings mounted therein, each casing having an opening therein with a laterally adjustable shutter arranged thereon, burners arranged in said openings and cooking chambers arranged in said compartments and having openings in the bottom therein adapted to register with the burners arranged in said compartments.

6. In an apparatus of the class described, the combination of a frame comprising a plurality of supporting legs, side and end members formed by angle irons secured to the upper ends of said legs with one flange thereof projecting upwardly and the other extending laterally inward, angle irons connecting said legs at opposite ends of the frame near the lower ends of the legs, and having one flange extending laterally inward, a T-bar extending longitudinally between the end members of said frame with the flanges thereof extending laterally from its lower edge and secured at its opposite ends to said end members, and T-bars arranged between the side members of said frame and longitudinally extending T-bar to form a plurality of compartments, burners arranged in said compartments, cooking chambers supported in said compartments on the flanges of said side and end members and said T-bars and gas pipes detachably mounted on the flanges of the lower angle irons at the ends of the frame.

In testimony whereof I have hereunto set my hand in presence of two subscribing witnesses.

NELS T. HANSON.

Witnesses:
 T. J. DECK,
 B. F. DECK.